United States Patent [19]

Garcia et al.

[11] Patent Number: 4,791,555
[45] Date of Patent: Dec. 13, 1988

[54] VECTOR PROCESSING UNIT

[75] Inventors: Leslie C. Garcia, Poughkeepsie; David C. Tjon-Pian-Gi, Hopewell Junction; Stuart G. Tucker; Myron W. Zajac, both of Poughkeepsie, all of N.Y.

[73] Assignee: International Business Machines Corporation, Armonk, N.Y.

[21] Appl. No.: 21,621

[22] Filed: Mar. 2, 1987

Related U.S. Application Data

[63] Continuation of Ser. No. 544,674, Oct. 24, 1983, abandoned.

[51] Int. Cl.⁴ .................... G06F 15/16; G06F 15/347
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,787,673 | 1/1974 | Watson et al. | 364/200 |
| 3,979,728 | 9/1976 | Reddaway | 364/200 |
| 4,128,880 | 12/1978 | Cray, Jr. | 364/200 |
| 4,150,434 | 4/1979 | Shibayama et al. | 364/704 |
| 4,172,287 | 10/1979 | Kawabe et al. | 364/200 |
| 4,200,927 | 4/1980 | Hughes et al. | 364/200 |
| 4,298,936 | 11/1981 | Shapiro | 364/200 |
| 4,414,669 | 11/1983 | Heckelman et al. | 364/200 |
| 4,435,765 | 3/1984 | Uchida et al. | 364/200 |
| 4,636,942 | 1/1987 | Chen et al. | 364/200 |

OTHER PUBLICATIONS

"IBM 3838 Array Processor Functional Characteristics", 1976, 1977, 1978, 1981, pp. 1-2, iii, 5-9, 11-13, 17, 19, 20, 21.
Intel, "iAPX86, 88 User's Manual", 8/81, pp, S-2, S-8.

Primary Examiner—Gary V. Harkcom
Assistant Examiner—Christopher H. Lynx
Attorney, Agent, or Firm—Robert W. Berray

[57] ABSTRACT

A functional unit designed with arithmetic pipelining for vector processing is attached to a base data processor from which it receives vector instructions and operands for processing. Stepping of operands and exception indicators through the vector processing unit is controlled by the base processor. Exception information transferred to the base processor is controlled to provide precise indicators of error conditions for recovery and restart of vector processing. Masking logic provides for expansion/contraction of operands in the vector processing unit as compared with sequential main memory addresses.

10 Claims, 13 Drawing Sheets

ARITHMATIC & LOGIC

LOAD EXP / MATCHED

STORES

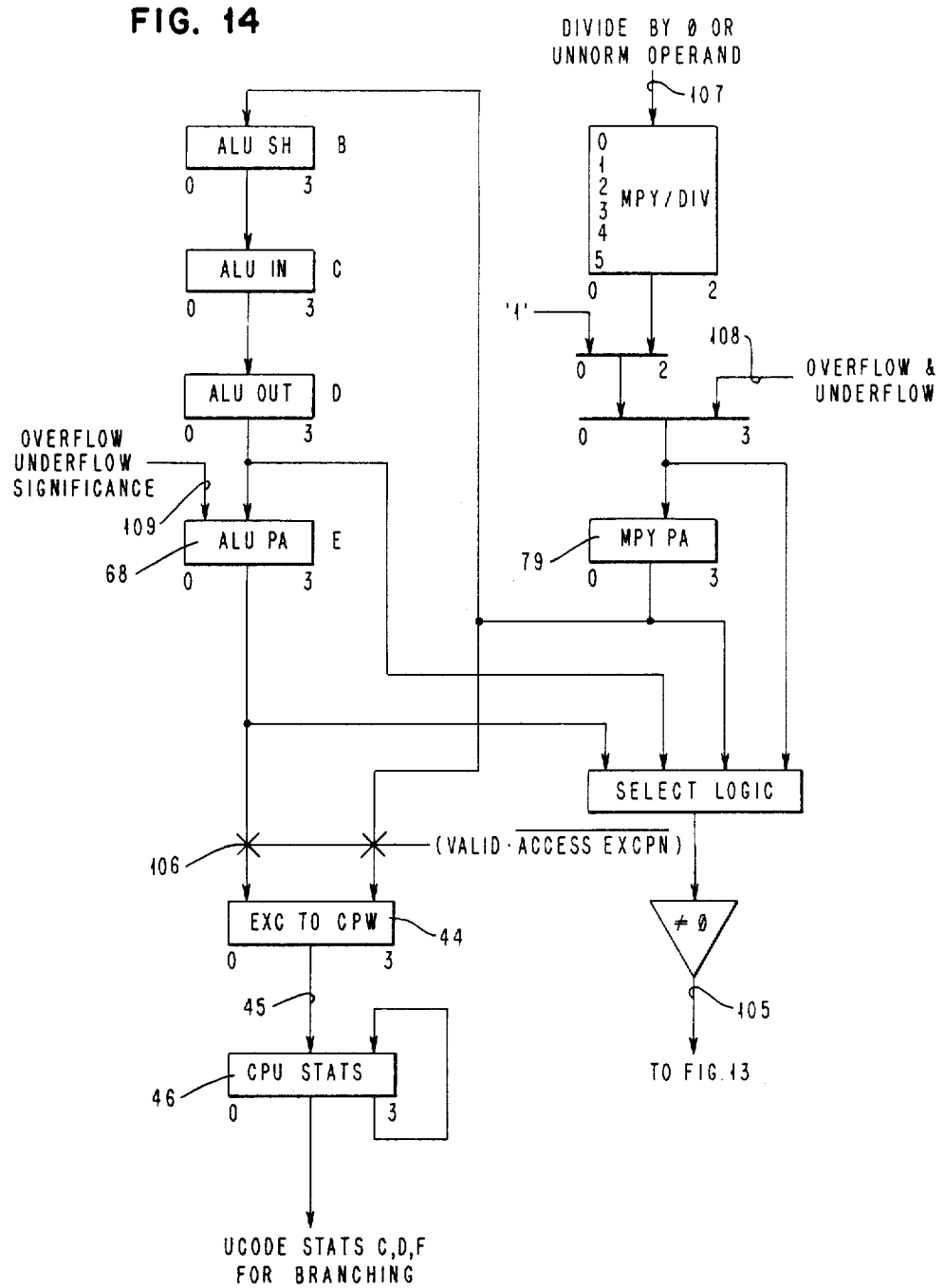

VECTOR PROCESSING UNIT

BACKGROUND OF THE INVENTION

This application is an FWC of Ser. No. 544,674 filed 10/24/83 now abandoned.

This invention relates to data processing apparatus, and more particularly to such apparatus that includes a functional unit using existing controls and data paths for scalar arithmetic to perform vector arithmetic in the functional unit designed for that purpose.

The following U.S. patents are representative of existing data processing configurations that provide vector data processing.

U.S. Pat. No. 4,128,880 describes a specially designed procesor for vector processing that requires its own programming, and must rely on a host computer for providing it with vector data for processing. This patent also identifies other processors that provide very high speed processing for very large problems which provide capabilities well beyond the needs of many users.

The other extreme for processing vector operands is represented by U.S. Pat. No. 4,172,287. A general purpose data processor originally designed for scalar arithmetic, including an arithmetic and logic unit designed for handling a pair of operands for each instruction executed, has been modified to recognize vector instructions. Most of the modifications deal with handling memory address arithmetic for vector element accessing. A vector buffer has been added for use in only a very specific memory addressing situation to provide some speed enhancement for overall processing. However, even with these modifications, the original arithmetic unit is still utilized. In this latter prior art patent, an additional store for vector instruction microprogramming is also required thereby retaining the speed degredation inherent in this form of execution control. Also, the interrupt handling capability of the basic processor must be relied upon, providing a lesser degree of accuracy of error handling in vector processing situations.

SUMMARY OF THE INVENTION

A main object of the invention is to provide a general purpose data processing system with high speed vector processing capability by simple connection of a vector processing functional unit to the base instruction handling and execution apparatus of the central processing unit (CPU).

Another object of the invention is to provide vector processing for a base data processor having microprogramming control that only requires the microprogram control to provide an advance signal to the vector functional unit.

A further object of the invention is to provide precise interrupt and error information to the base system suitable for accurate handling of vector exceptions.

Another object of the invention is to provide a vector processing functional unit including addressable vector registers and masking capability to allow flexible handling of only certain elements of a longer string of elements.

These and other objects, features, and advantages of the invention are realized in a hard-wired vector processing functional unit that includes addressable vector registers, a pipelined arithmetic unit that includes a parallel adder and multiply/divide unit, exception or error indicating logic that parallels the pipelined arithmetic unit, and masking logic for operand accessing control. The vector functional unit relies entirely on the instruction handling and control logic of a base processor, as well as the operand fetching and storing capabilities of the base unit for receiving instructions to execute, and vector elements to be operated on. The vector processing functional unit advances through vector processing in synchronism with the base machine by receiving an advance signal from the microprogram control of the base system.

The vector processing functional unit arithmetic pipeline includes a plurality of stages, each of which includes exception or error indicating logic. The exception or error indicating logic inhibits the putaway of erroneous results, and provides error or exception information to the base system for the accurate handling and recovery from exception conditions.

A mask register and logic provides flexibility in handling only certain elements of a long vector by consolidating certain elements in the vector storage of the vector functional unit. This requires less processing once the elements have been accessed, and makes the pipeline of the arithmetic unit more effective.

BRIEF DESCRIPTION OF THE DRAWINGS

FIG. 14 shows the logic of the vector processing unit of the present invention responding to an arithmetic exception indicating an error encountered during arithmetic processing the vector processing unit of the present invention.

DETAILED DESCRIPTION OF THE INVENTION

Figure 1:
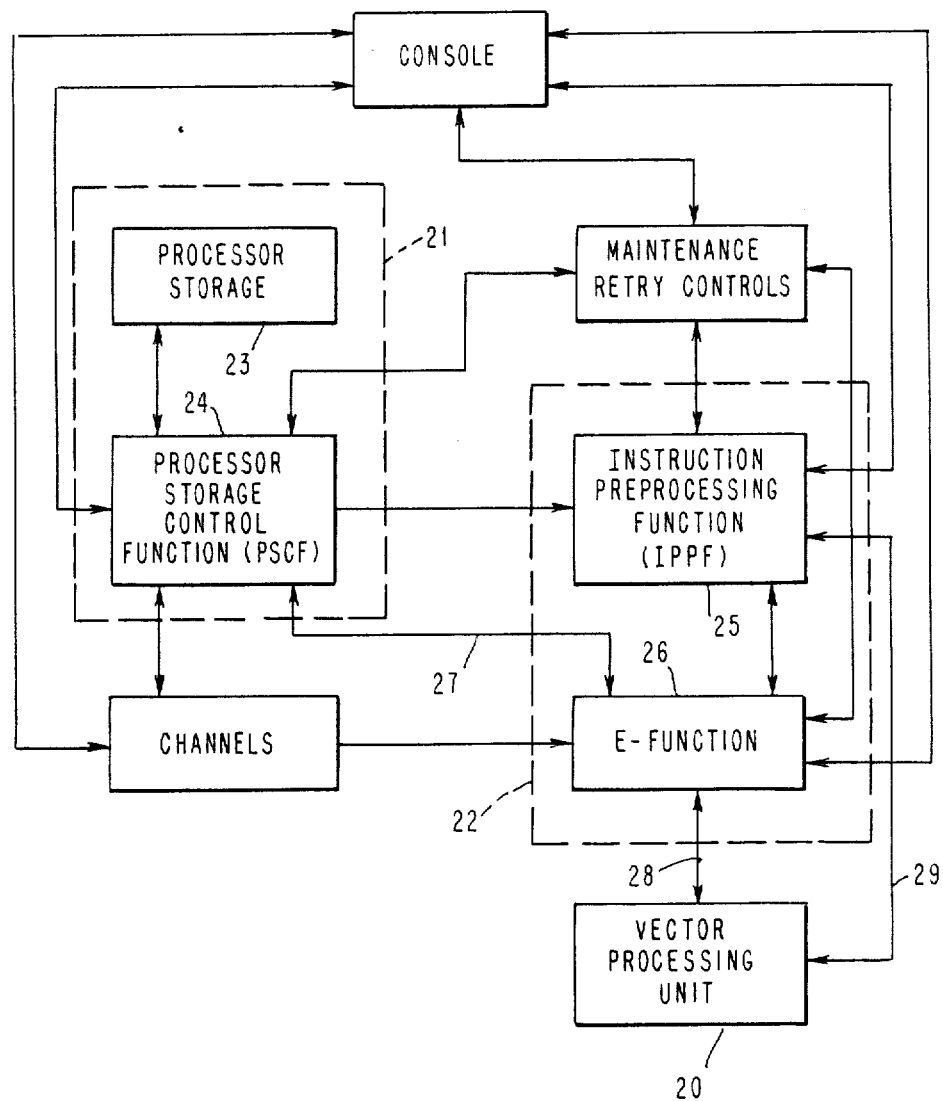
FIG. 1 is an overall block diagram of an existing data processing system with the vector processing functional unit of the present invention included.

FIG. 1 is a block diagram of a data processing system including a VPU 20 which is the subject of the present invention. With the exception of the VPU 20, the remainder of FIG. 1 represents a base data processing system more fully described in U.S. Pat. No. 4,200,927 entitled Multi-Instruction Stream Branch Processing Mechanism and assigned to the assignee of the present invention. Further descriptions of the VPU 20 will refer to certain portions of the base data processing system including memory means 21 and a central processing unit (CPU) 22.

The memory means 21 includes processor storage 23 and processor storage control function (PSCF) 24. The memory means in utilized for the storage of program instructions and data operands including vectors to be processed by the VPU 20. The CPU 22 includes an instruction pre-processing function (IPPF) 25 and an E-function unit 26. These units are described in more detail in the above referred to U.S. Pat. No. 4,200,927. The IPPF 25 is responsible for fetching and decoding all instructions including those to be executed by the E-function 26 and those to be executed by the VPU 20. As more fully described in the above referred to patent, the E-function unit 26 executes non-vector processing instructions, provides a data path 27 between the E-function 26 and memory means 21, and includes a microprogram control store for generating instruction execution control signals.

Interconnection of the VPU 20 with the base data processing system is by means of an interface 28 between the VPU 20 and E-function 26, and an interface 29 between the VPU 20 and the IPPF 25.

Figure 2:
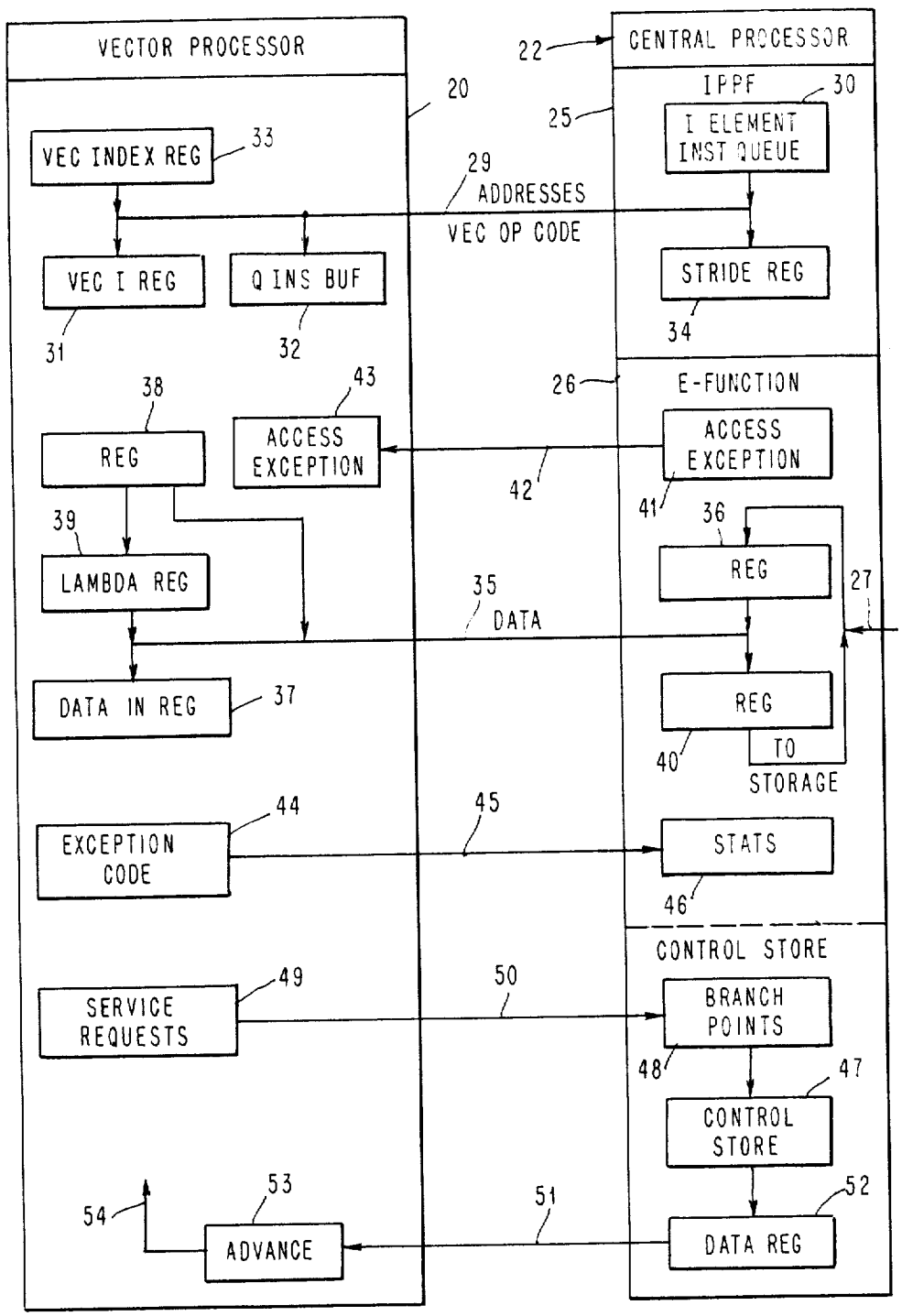
FIG. 2 shows the major interface line between the central processing unit (CPU) of a base data processor and the vector process of the present invention.

FIG. 2 shows various functional units in the VPU 20 and CPU 22, and further detail involving the information that is transferred on interface 28 and interface 29 shown in FIG. 1.

Interface 29 transfers vector instruction op codes from the I element instruction queue 30 in the IPPF 25 to a vector instruction register 31 and Q instruction buffer 32 of the VPU 20.

The interface 29 is also utilized to transfer address information between a vector index register 33 and a stride register 34. The stride register 34 contains address separation between elements of a vector of ordered elements.

Further details of the interface 28 between the VPU 20 and E-function 26 of the CPU 22 are shown in FIG. 2. The transfer of data between the VPU 20 and the memory means 21 of FIG. 1 includes a data bus 35. Data from the memory system 21 of FIG. 1 to the VPU 20 includes the data bus 27, register 36 of the E-function 26, data bus 35, to a data in register 37 in the VPU 20. Data to be transferred from the VPU 20 to the memory system 21 of FIG. 1 includes data from register 38 or lambda register 39 in the VPU 20 over the bus 35, which is bidirectional, to a register 40 in the E-function 26 to the bus 27.

A great dealof arithmetic pipelining takes place in the VPU 20, and a great deal of address arithmetic takes place when long vectors are processed. When various error conditions occur, either in the CPU 22 or VPU 20, it is important to indicate the precise point in the sequence of an instruction execution where an error condition occurred.

One error condition that can occur is the detection of an error in data accessed from the memory system 21 to the E-function 26. Rather than reacting to the detection of an error in the E-function 26, which would normally cause all processing to cease, the access exception will be noted at 41 in the E-function 26, and be passed over a line 42 to an access exception mechanism 43 in the VPU 20. The access exception noted at 43 will be utilized at a subsequent time to provide more accurate information as to how far instruction processing has progressed on along string of vector elements. This will be described subsequently.

Other error conditions that can occur involve the detection of arithmetic errors in the VPU 20. In response to arithmetic errors, an exception code is provided at 44 and passed over a line 45 to status indicators 46 in the CPU 22. The arithmetic exceptions are indicated by a coded representation and stored in the status triggers 46 for analysis by the CPU 22 to determine corrective action to take.

As referred to earlier, and shown in FIG. 2, the E-function 26 has as its basic control mechanism a microprogram contorl store 47. A branch, or change in sequence of microinstruction execution in the control store 47, is signalled by logic 48 indicating various branch points. Several signal lines, representing branch requirements, are signalled by service requests 49 from the VPU 20 which are transferred on a line 50 to the branch point logic 48.

One final line shown in FIG. 2, which is a part of the interface 28 of FIG. 1, is line 51. As microinstructions are read from control store 47, and placed in a data register 52, a decoder provides execution control signals to the E-function 26 of the CPU 22. As part of the present invention, timing control of the operation in the VPU 20 is effected by the basic clock cycles of the CPU 22. The sequencing of various functions in the VPU 20 is under control of a signal on line 51 from the decoding of data register 52. This signal is labelled advance 53. All timing and gate energization in the VPU 20 is synchronized with, and under control of, microinstruction sequencing indicated on line 51, and respond to an advance pulse on line 54 which goes to all of the logic and gates of the VPU 20.

Figure 3:
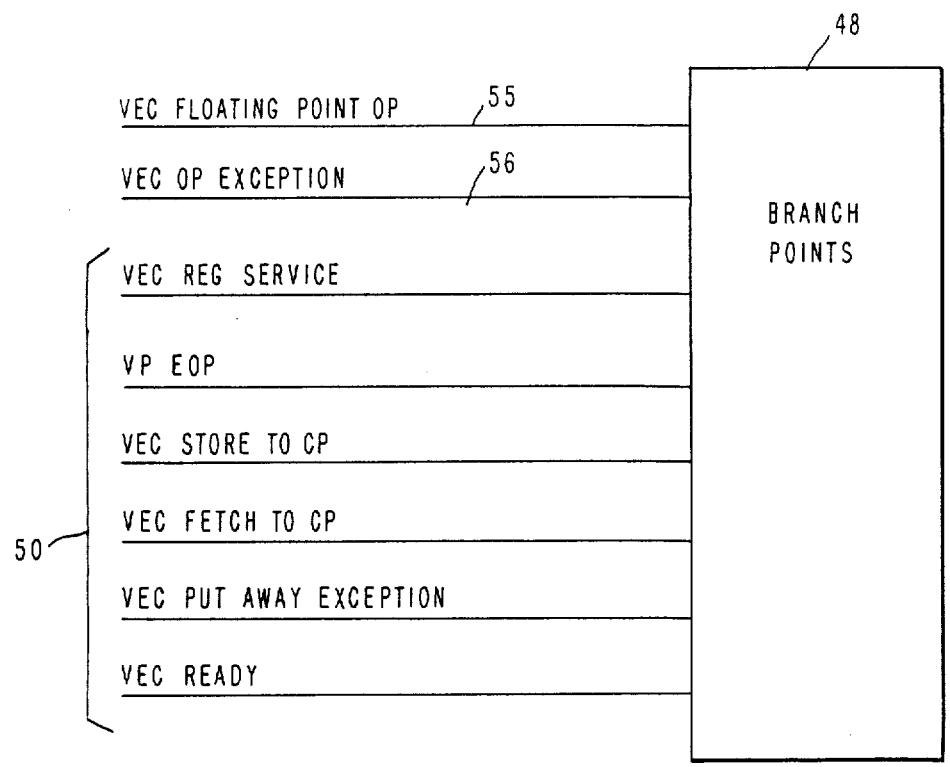
FIG. 3 shows the signals presented to the microprogram branching logic of a base data processor for dealing with vector processing.

FIG. 3 shows certain of the VPU 20 status information signalled on line 50 of FIG. 2, which status information is utilized in the branch points 48 logic to control sequencing of microinstructions from control store 47. Signal lines 55 and 56 show vector processing related signal lines from the IPPF 25 and E-function 26 in FIG. 2. Branching in the microinstruction sequencing of control store 47 will occur from certain VPU 20 conditions indicating readiness of the VPU 20, the requirement for an operand fetch or store, end of a vector instruction, and a vector exception indication.

Figure 4:
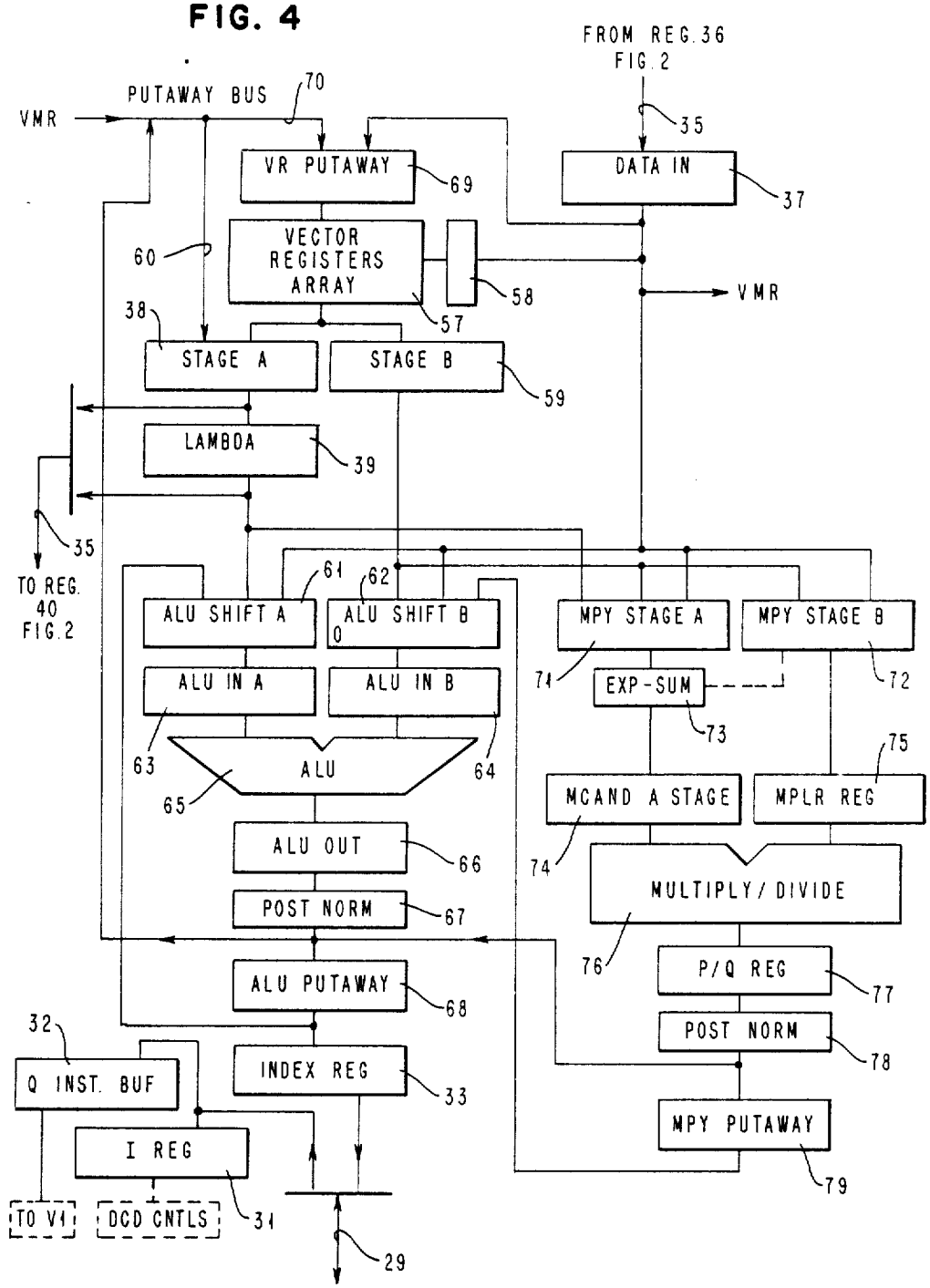
FIG. 4 shows the functional elements of the vector processing unit of the present invention and the controllable interconnection of these elements in a data flow path.

FIG. 4 shows various parts, registers, and functional units of the VPU 20 of the present invention. Certain of the registers and buses dealing with the interface between the VPU 20, and the CPU 22 have already been referred to in connection with FIG. 2. The buses include the interface lines 29 and 35. Registers include data in register 37, register 38 and 39 labelled stage A and lambda respectively, the instruction register 31, instruction buffer 32, and the address index register 33.

The function of these registers, and others to be further described, and the arithmetic units will now be described. In FIG. 4, there is shown a vector register array 57. The array 57 contains 16 vector registers (VR's), with each VR consisting of 128 four-byte elements. The VR's can be coupled (even-odd paired) to form double word operands. Addressing of the vector register array 57 involves a number of address registers which will be subsequently described, but which are noted generally in FIG. 4 at 58.

Stage A register 38 and stage B register 59 accept data that is read from the VR's 57. From register 38, the data goes either to the vector data path or the E-function 26, depending on the instruction. Register 38 can also accept data from a vector mask register (VMR) on a line 60. The function of the VMR will be described subsequently. Register 39 is used as a delay register for the arithmetic data flow as well as a back-up register for data being sent to the E-function 26 from register 38. The data delay is necessary to implement proper VR access.

Registers 61 and 62 receive information from a variety of sources. Their outputs are to pre-shifting logic used during exponent alignment for floating point operations. The ALU in registers 63 and 64 respectively are staging registers that contain data to be processed by the ALU 65. The arithmetic and logic unit (ALU) 65 is a parallel binary adder. The ALU out register 66 holds the output of the ALU 65 from the previous cycle. Post normalizing logic 67 is provided for floating point operations. The ALU put away register 68 receives its input from the post normalized logic 67. Register 68 serves as a delay register for data that is to recycle to the ALU 65. Register 68, together with register 61, register 63, and register 66, form a four cycle closed path circuit that is used for vector accumulate instructions to be subsequently described.

Index register 33 has an input from register 68. The index register 33 is used to hold the addresses generated during index type instructions. When appropriate, the address is then sent to the address incrementor in the IPPF 25 shown in FIG. 2.

The VR put away register 69 serves as a stage for data that is to be written into the VR array 57. Its inputs are from register 37 or from a put away bus 70 which has several sources.

Registers 71 and 72 are a multiply stage A register and a multiply stage B register respectively. These registers contain data that is fed to the remainder of the multiply data path including exponent summation logic 73. The multiplicand A stage register 74 holds the multiplicand for a multiply operation and the divisor for a divide operation. It also buffers the dividend during divide functions. The multiplier register 75 stores the multiplier for multiply operations and recoded quotients of divide operations.

The output of registers 74 and 75 provide inputs to a multiply/divide unit 76. The remainder of the multiply/divide data path includes, at the output of the multiply/divide unit 76, a product/quotient register 77, and post normalizing logic 78. The final register in the multiply/divide data path is the multiply put away register 79 which is fed from the post normalizing logic 78, and serves as a delay register for data that is to be fed to the data path of the ALU 65 for certain compound vector instructions and for all vector divide instructions as part of the divide function.

The data in register 37, previously referred to, serves as a buffer for data coming from register 36 in the E-function 26 of FIG. 2. The ALU 65 is an arithmetic and logic unit which performs addition and subtraction on binary, short precision, and long precision operands. The ALU 65 can also perform the AND, OR, and EXOR logical operations, and logically shift an operand 0, 1, 2, or 3 bits left.

The instruction buffer 32 which receives information on the interface 29, retains the vector instruction op code and vector register addressees for use by other decode circuits in the VPU 20 during instruction execution.

Still referring to FIG. 4, vector operand data comes from either the VR array 57 or the CPU 22 through the data in register 37. When both operands are from the VR's 57, the first vector element fetched goes through the A-side of the data path. The second vector elements go through the B-side of the data path. All parts of the appropriate data path (ALU 65 or multiply-divide unit 76) are stepped simultaneously. Initially, the first element of the A-side vector operand is read out of the VR's 57 one cycle earlier than the first element of the B-side vector operand. Thus, after two cycles, A-side element 1 is in the lambda register 39, the B-side element 1 is in the stage B register 59, the A-side element 2 is in the stage A register 38. This initial offset is to accommodate the single port array chips that comprise the VR's 57. This offset, in conjunction with the arrangement of logical vectors in the physical array chips, to be subsequently described, guarantees that only one read is made from any array chip during any given cycle. A vector result from the VR put away register 69 can be stored into the VR's 57 each machine cycle.

When there is one vector from the memory system 21 of FIG. 1, and one vectgor form a VR 57, the vector from the VR 57 flows through the B-side of the data path. The vector from storage comes from the E-function 26, into the data in register 37, and then through the A-side of the data path beginning at either the ALU shift A register 61 or the mulitply stage A register 71. The vector result is written into a destination VR 57, as specified by the instruction.

When there is one vector from a VR 57, and a scalar operand from the E-function 26, the CPU 22 uses a signal to put the scalar operand into hte A-side of either the ALU 65 or the multiply-divide unit 76 data path. The register 61 or the multiply stage A register 71 and is fed to the subsequent logic. The VR 57 operand flow through the B-side of the data path. The result is then written into a destination VR 57.

When there is one vector from the memory system 21 and one scalar element from the E-function 26, the CPU 22 generates a signal to put the scalar operand into the A-side of either the ALU 65 or the multiply/divide unit 76 data path. The CPU 22 then issues an advance signal to step the vector storage operand through the B-side of the data path. The result will then be written into a destination VR 57.

When a sequence of elements of a vector are to be transferred from the memory system 21 to the VPU 20, the data transfer path for a vector load instruction is from the CPU 22 register 36, onto the data bus 35, and into the data in register 37. The data is then stored into a VR 57 through the VR put away register 69. Each time an element is written into a VR, a vector element address register, to be discussed, is incremented by 1. For load instructions that use a stride, that is the memory address between successive elements is something other than 1, the CPU 22 calculates storage addresses of vector elements, makes a fetch request to storage, and transfers data at a maximum rate of one element per cycle. For vector load instructions that use a mask register, to be discussed, the bit mask is examined and determines whether or not a particular element is to be loaded into a VR 57. For instructions that use an index vector as part of the address calculation, the VPU 20 calculates the storage addresses. The address is then sent to the CPU 22 on interface 29 which makes the fetch request and transfers the data to the VPU 20 on the data bus 35.

During vector store instructions, the VPU 20 transfers data to the CPU 22 from a VR 57, through the stage A register 38, and onto the bidirectional data bus 35. If a clock stopping situation should occur in the CPU 22, a signal becomes active in the VPU 20 one cycle later. The data that was to be placed onto the data bus 35 is held in the lambda register 29. When execution resumes, the data in the lambda register 39 is put onto the data bus 35. As with vector load instructions, address calculations, vector mask utilization, and index vector usage is accomplished in the same manner.

Figure 5:
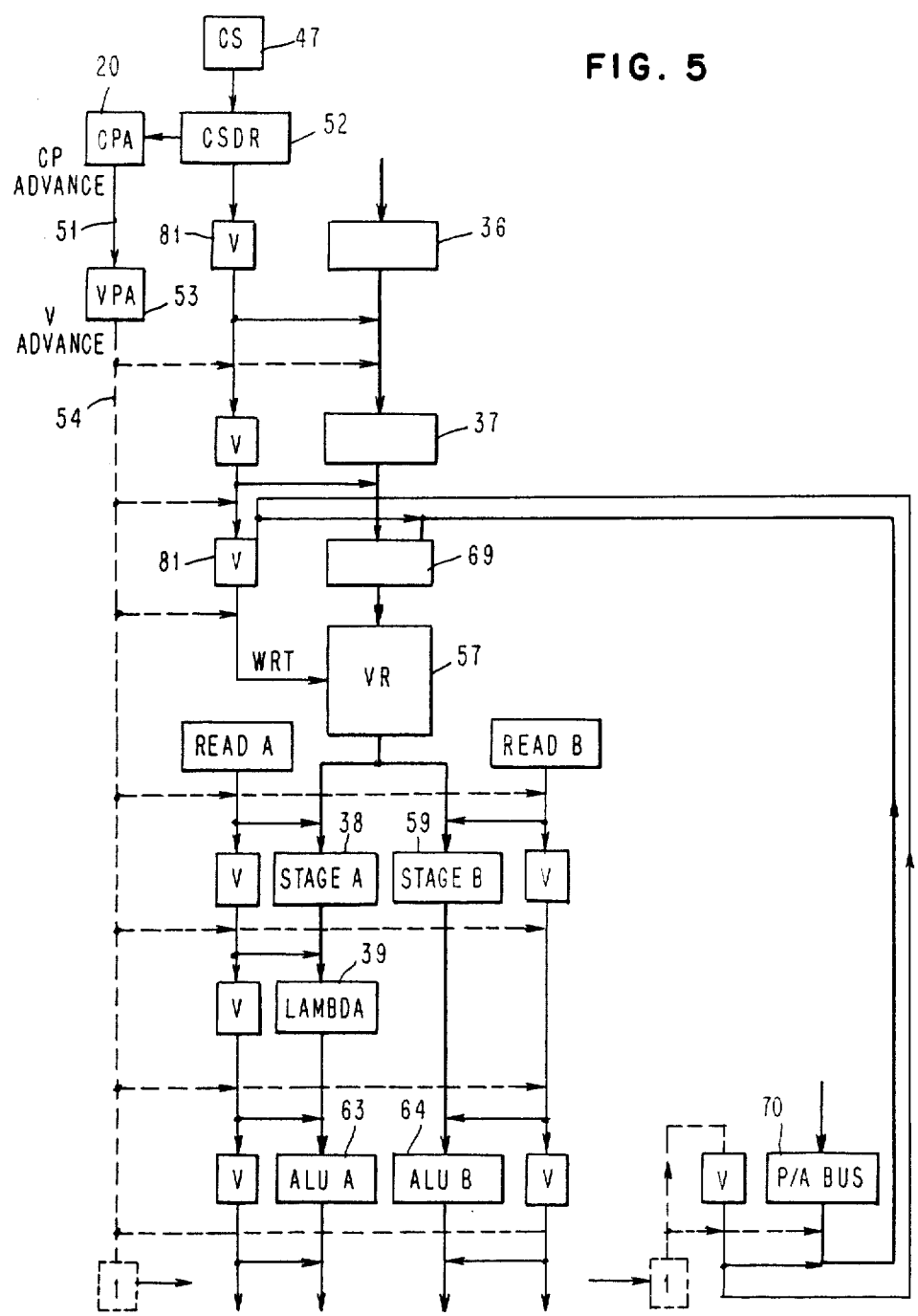
FIG. 5 shows the data path of the vector processing unit of the present invention and the control of data advance by the microprogram control of a base system.

Positive control of the cycling of the VPU 20 by the CPU 22 is shown in FIG. 5. Elements previously referred to in the CPU 22 include the control store 47, the control store data register 52, and register 36. The positive control exercised by the CPU 22 is effected by detecting a particular micro-order of a particular microinstruction in the control store data register 52 which sets a one cycle trigger 80 labelled CP advance. Signal line 51 will be energized and effective at 53 to generate a VP advance signal 54 which is applied to all data path gates between stages of the VPU 20 data path. The vector data does not advance through the data path unless the advance signal 54 is present. This assures synchronization and positive CPU 22 control over the VPU 20. When the vector advance signal 54 is not active, each register in the data flow retains its data. Otherwise, the data is ingated as directed by instructions in the VPU 20.

Also shown in FIG. 5, is a data valid bit which parallels the functional data path in the VPU 20. The initial data valid bit shown at 81, is associated with the data register 36 in the CPU 22, and is set by a microinstruction micro-order to indicate that the contents of the register 36 are valid and can be gated to the VPU 20. The function of the data valid bits is to guarantee validity of the data being processed in a particular stage. Absence of the data valid bit associated with put away register 69 prevents updating of a VR 57. The CPU 22 or output or a VR 57, depending on the source of operands, raises the data valid bit with each element to be processed, and drops the data valid bit after the last element is processed.

When the data valid bit 82 associated with the put away register 69 permits updating of a VR 57, a counter is incremented to provide an indication of the number of vector elements that have been properly processed. This counter also indicates completion of processing of all elements in a vector. This counter is utilized in those situations where errors occur, and a need arises to indicate the total number of elements that have been properly processed when the processing is resumed for a particular vector instruction. The passage of data valid bits through the data path is configured by control lines dependent upon a particular vector instruction being executed.

Figure 6:
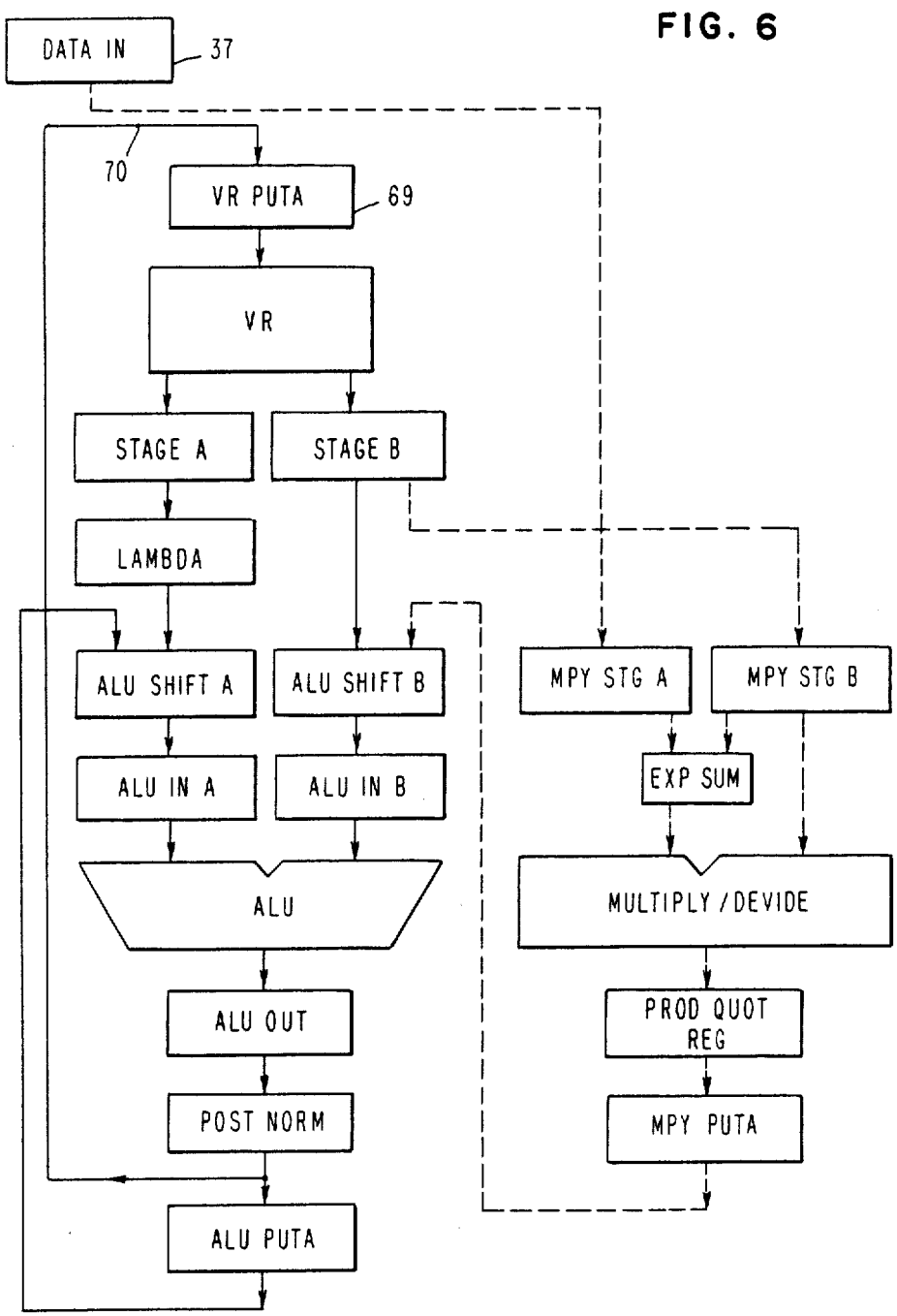
FIG. 6 shows the interconnection of elements of the vector processor of the present invention for executing two representative vector instructions.

All of the elements shown in FIG. 6 have been previously referred to and have been given the same numeric designations. FIG. 6 shows two configurations of the data flow path in the VPU 20 for two representative vector instructions. The solid lines of the data path indicate a configuration for doing a VR accumulate instruction, and the dotted path shows a configuration for performing a VR and main storage multiply and accumulate instruction.

For the vector register accumulate instruction, four partial sums are read out of a VR 57 into the A-side of the data flow. The partial sums are stepped through the stage A register 38, lambda register 39, ALU shift A register 61, and ALU in register 63, and the valid bit for that stage turns on, reading for the B side of the data flow will commence. Data in the data path continues to step while the B side is being read out.

When the element to be accumulated enters the stage B register 59, the first partial sum from the A side of the data flow enters the ALU put away register 68. The next advance transfers the ALU put away register 68 contents into the ALU shift A register 61 on line 83 while the stage B register 59 contents are transferred to the ALU shift B register 62. Advance pulses now step both operands through the data flow, and the accumulated results are gated first into the ALU out register 66 and then to both the ALU put away register 68 and VR put away register 69 on line 84. The VR put away register 69 places accumulated results into one of four partial sum locations of a VR 57. The ALU put away register 68 wraps the results back to the ALU shift A register 61. This partial sum is then fed into the ALU 65 with another element from the B side and the operation continues. The result of the accumulate instruction is that every fourth element is added and the results are put into one of four partial sum locations of a vector register.

The dotted lines of FIG. 6 show a configuration for multiply and accumualte utilizing data from main storage. The first advance gates data from storage to the data in register 37 and the first element of a VR 57 operand into the stage B register 59. A second advance gates data in register 37 to multiply stage A register 71, stage B register 59 to the multiply stage B register 72, and the first partial sum into stage A register 38. The gates energized by the second advance are used for five more cycles. At this time, five more elements hvae been read into the data flow of the multiply/divide unit 76. However, data in the multiply put away register 79 has not yet been marked valid and the partial sum 0 is in ALU put away register 68. The data flow for the ALU 65 is blocked from further advances until the multiply put away register 79 indicates valid data. When good data and its associated valid bit reach the multiply put away register 79, the next advance gates the ALU put away register 68 to the ALU shift A register 61 and the multiply put away register 79 to the ALU shift B register 62. After four more advances, the accumulated result along with the valid bit reach the ALU put away register 68 and VR put away 69. Writing of results into the vector register 57 starts when the first sum of the product and partial sum 0 reaches ALU put away 68.

Figure 7:
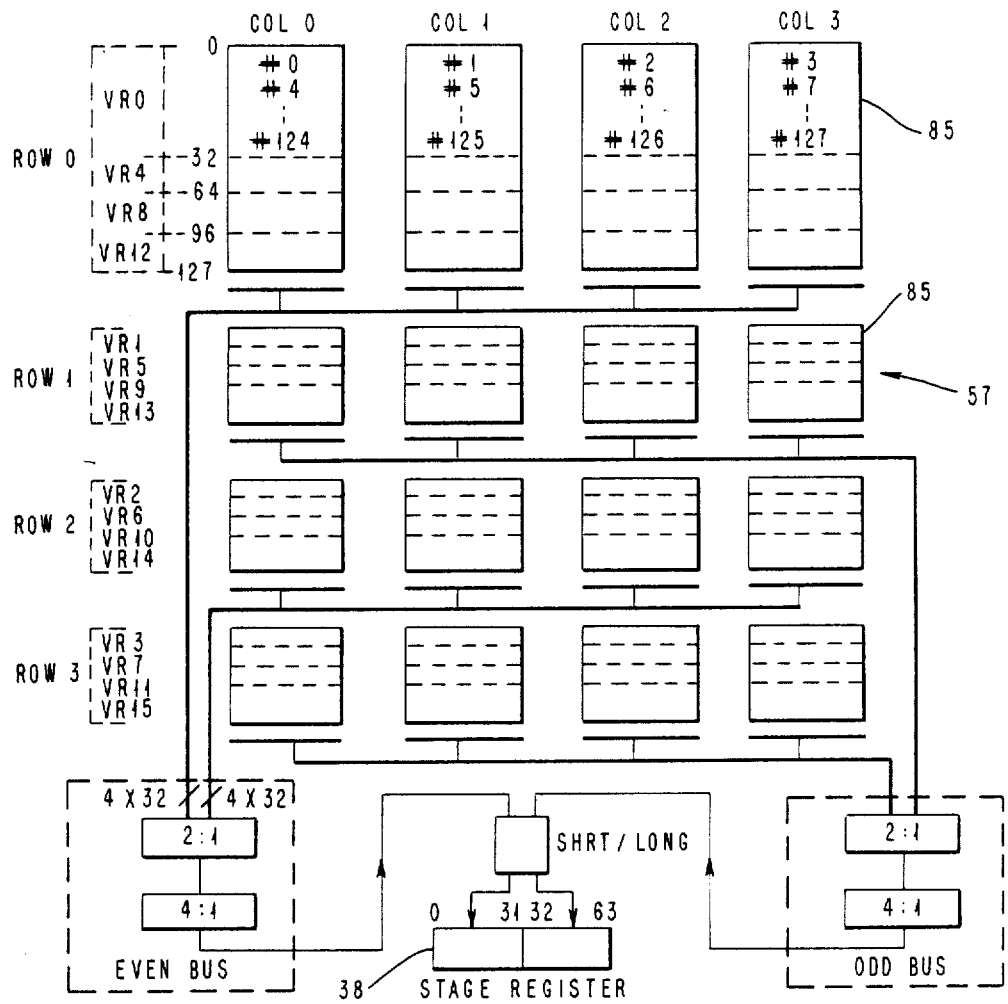
FIG. 7 shows the arrangement of vector registers in the vector processing unit of the present invention and the output data path.
Figures 8, 9:
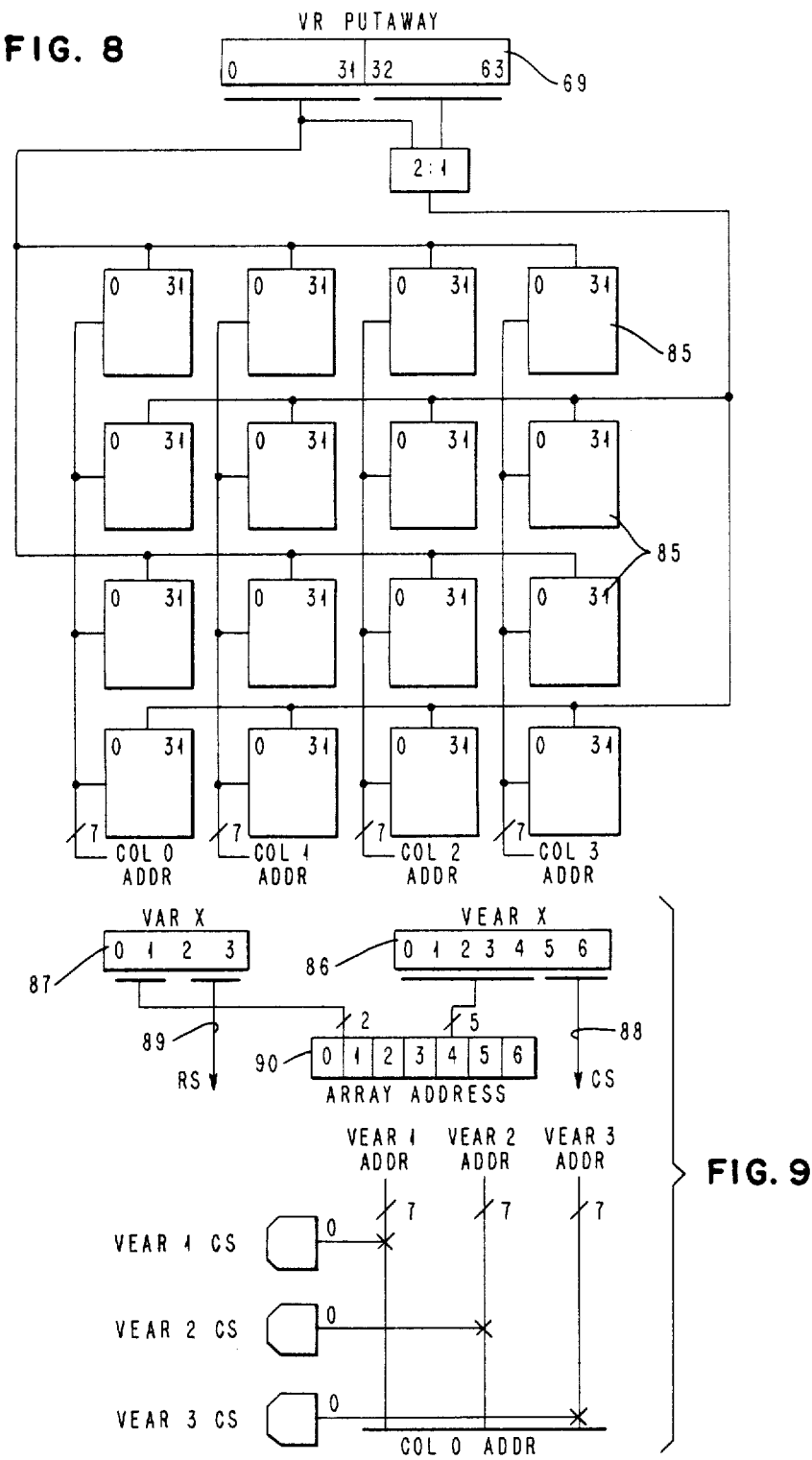
FIG. 8 shows the arrangement of vector registers in the vector processing unit of the present invention and the input data path.
FIG. 9 shows the addressing logic for the vector registers of the vector processing unit of the present invention.

FIGS. 7, 8, and 9 show the logical configuration of the vector register array 57 and the vector register array addressing mechanism shown generally at 58 in FIG. 4. The array 57 contains 16 vector registers (VR's), with each register consisting of 128 four-byte elements. The VR's can be coupled (even-odd paired) to form double word operands. The entire array is in 64 array chips 85. Each chip 85 is nine bits wide (eight bits plus parity). Because the array chip 85 is limited to a single read/write per cycle, it is necessary to four-way interleave the VR's as shown in FIG. 7. Each column of the array represents one interleave which consists of 16 chips 85 grouped by four. Each row of the array 57 represents four VR's. The relationship of the elements 0 through 127 for vector register number 0 (VR 0), as configured in the four columns, is shown in FIG. 7. The VR's can provide two elements per cycle from the VR registers to a stage register such as 38, and FIG. 8 shows the reading of data into the VR's through the VR put away register 69.

Addressing of the vector register array 57, shown generally at 58 and FIG. 4, is shown in more detail in FIG. 9. These are there vector element address registers (VEARs) labelled VEAR 1, VEAR 2, and VEAR 3. These registers are noted generally in FIG. 9 at 86. VEAR 2 and VEAR 3 normally contain the element numbers of source vectors that are being read from the VR's during any given cycle. VEAR 1 contains the number of element of the vector that is being written into the VR's.

VEAR 1 is also utilized as a vector interruption index (VIX) for most vector instructions that write results into the VR's. Each VEAR is updated by its own incrementor and is loaded from data in register 37 shown in FIG. 4.

The VIX is incremented only when a data valid signal associated with the VR put away register 69 is effective to permit a writing into the VR's. Therefore, if an error condition indicates that a VR should not be updated, the VIX will not be stepped and will provide an indication of the number of elements that have been processed during a particular instruction execution. This information can be utilized when the instruction is re-initiated after any fix-up routines.

The addressing mechanism also includes three vector address registers (VARs) noted generally at 87 in FIG. 9. The VAR's are labelled VAR 1, VAR 2, and VAR 3. VAR 2 and VAR 3 normally contain the numbers of the source VR whose elements are being read. VAR 1 contains the number of the destination VR whose element is being written.

Bits five and six of a VEAR 86 provide a column select (CS) on line 88, and bits two and three of a VAR 87 provide row select (RS) on a line 89. The seven-bit address shown at 90 is utilized for addressing a particular one of 128 locations in each of the array chips 85.

As shown in FIG. 9, each column (interleave) can be addressed indepndtly. The same address is presented to all 16 array chips 85 in a column so it is possible to write into one column and read out of any one of the other three. Data selection is done in the logic chip before gating into the stage registers. Short operands are presented to both havles of the stage register, for example register 38. For long operands, the even register element goes to the left half (0–31) and the odd register goes to the right half (32–63).

Figure 10:
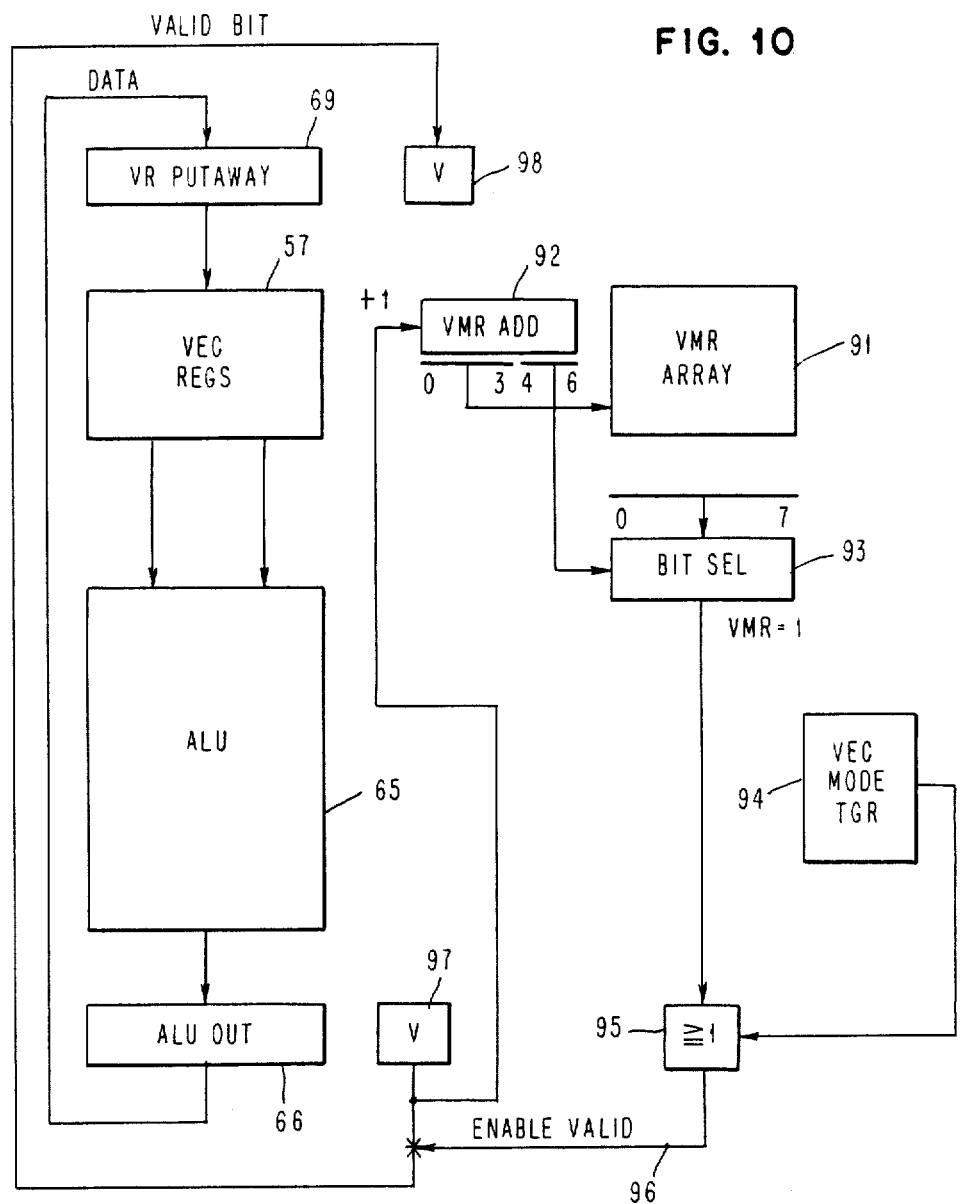
FIG. 10 shows the use of masking associated with elements of a vector during arithmetic operations in the vector processing unit of the present invention.
Figure 11:
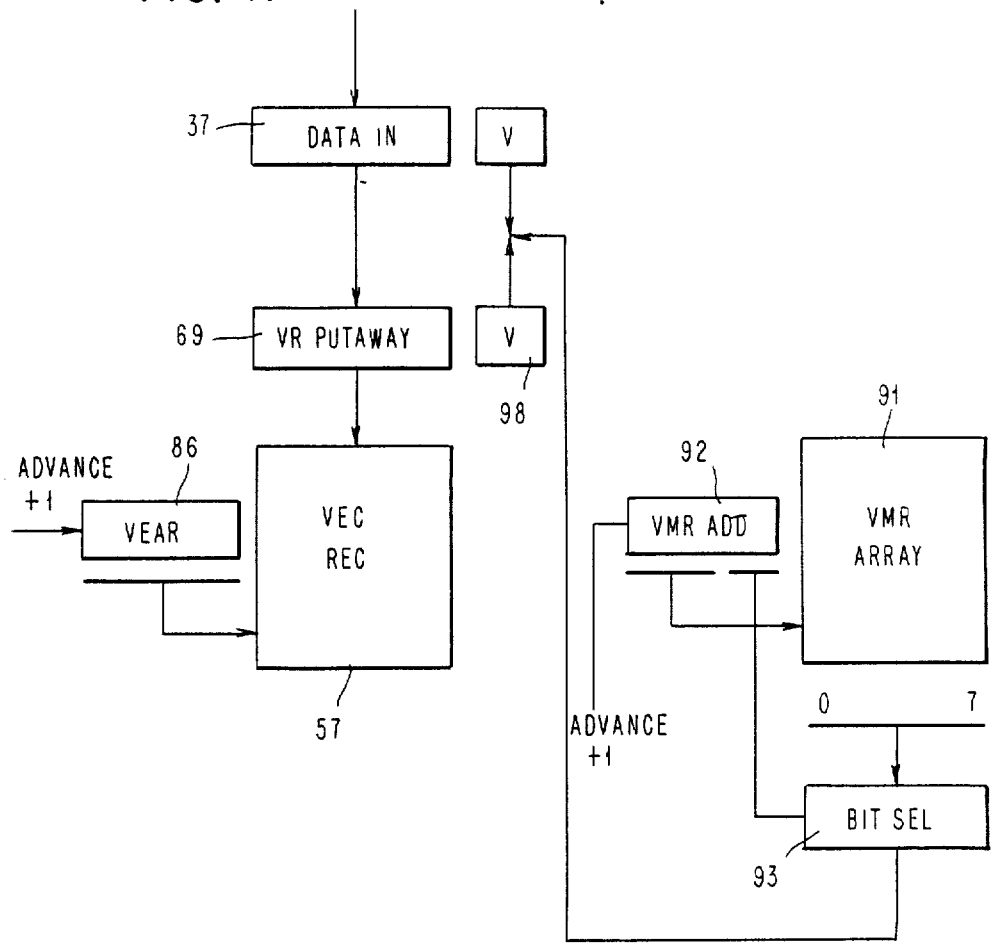
FIG. 11 shows the use of masking associated with elements of a vector during loading of elements from main memory into vector registers.
Figure 12:
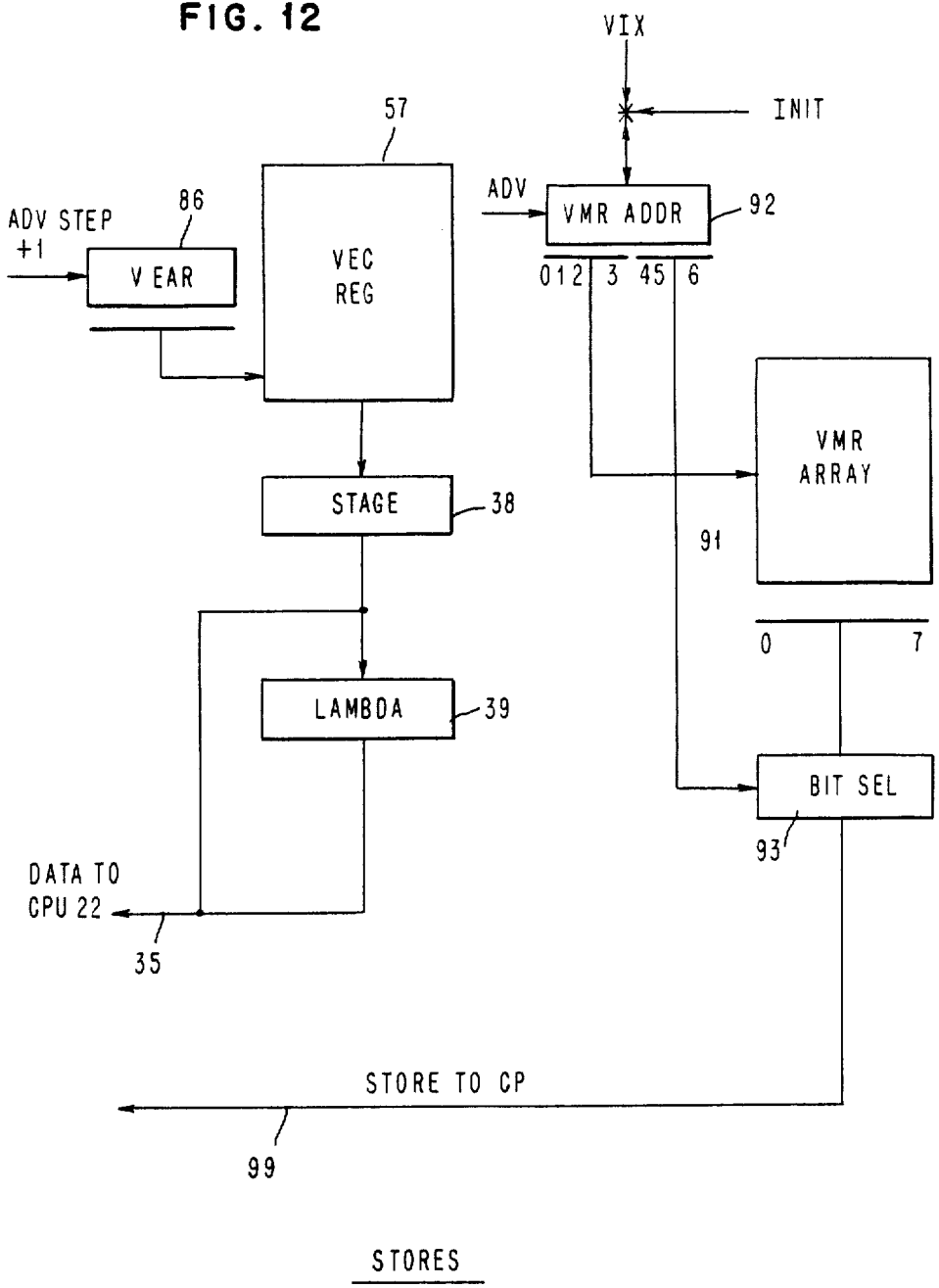
FIG. 12 shows the use of masking associated with elements of a vector during storing of elements in main memory from vector registers.

FIGS. 10, 11 and 12 show various uses of a mask register during vector processing. The vector mask register (VMR) logically consists of 128 bits, any one of which can be set or reset by processing in the VPU 20. It can be loaded with information form the main store or its contents stored in main store at a rate of eight bits per cycle. The 128 bits of the mask register correspond to the 128 elements of a vector stored in the VR's. As shown in FIG. 10, the 128 bits of the mask register are implemented as a VMR array 91 further configured as 16 eight-bit registers. The use of a particular binary bit of the VMR is selected by a VMR address register 92 and bit select logic 93. Bits 0–3 of the VMR address register 92 select one of the registers in the VMR array 91, and bits 4–6 select a particular one of the eight binary bits of the selected register. A choice of whether or not to use masking during arithmetic and logic processing is made by the set or reset state of a vector mode trigger 94. A gate 95 is enabled by the vector mode trigger 94 to provide an output 96 when a particular mask bit selected form bit select 93 is a binary one.

A first group of instructions involving the mask register are comprised of arithmetic and logic instructions. When the vector mode trigger 94 is off, each element of a vector flow through the data flow, undergoes the operation, and the result if put away in the VR's 57. If however the mode trigger 94 is on, then the operation proceeds as before but with one exception. As ALU 65 results are advanced to the ALU out register 66, and the valid bit 97 set, the signal 96 indicating a mask bit of binary one will be effective to gate the valid bit 97 to the valid bit 98 associated with the VR put away register 69. A vector mask register bit of binary 0 will not cause the ALU output result to be stored in the VR's 57. The vector mask regsiter address register 92 is incremented by 1 for each result that is stored in the ALU out register 66.

As shown in FIG. 11, the mask bits are utilized in an instruction called load expanded. In this case, vector elements are transferred to the data in register 37 from the CPU 22 from sequential addresses in main memory along with a data valid bit. For each advance pulse 54 the vector element address register associated with the destination VR 57, is incremented by 1 along with the VMR address register 92. Only those elements of the destination VR 57 associated with a vector mask bit that is a binary 1, will receive data from put away register 69, setting the data valid at 98 to cause storage of the element in a VR 57.

In the representation of FIG. 12, a sequence of 128 elements of a vector will be read from the VR's 57 to the stage register 38 or lambda register 39 and presented to the CPU 22 on the interface line 35. However, only those elements which have a corresponding mask bit which is a binary 1, signalled to the CPU 22 on line 99, will actually be stored in the main memory.

Figure 13:
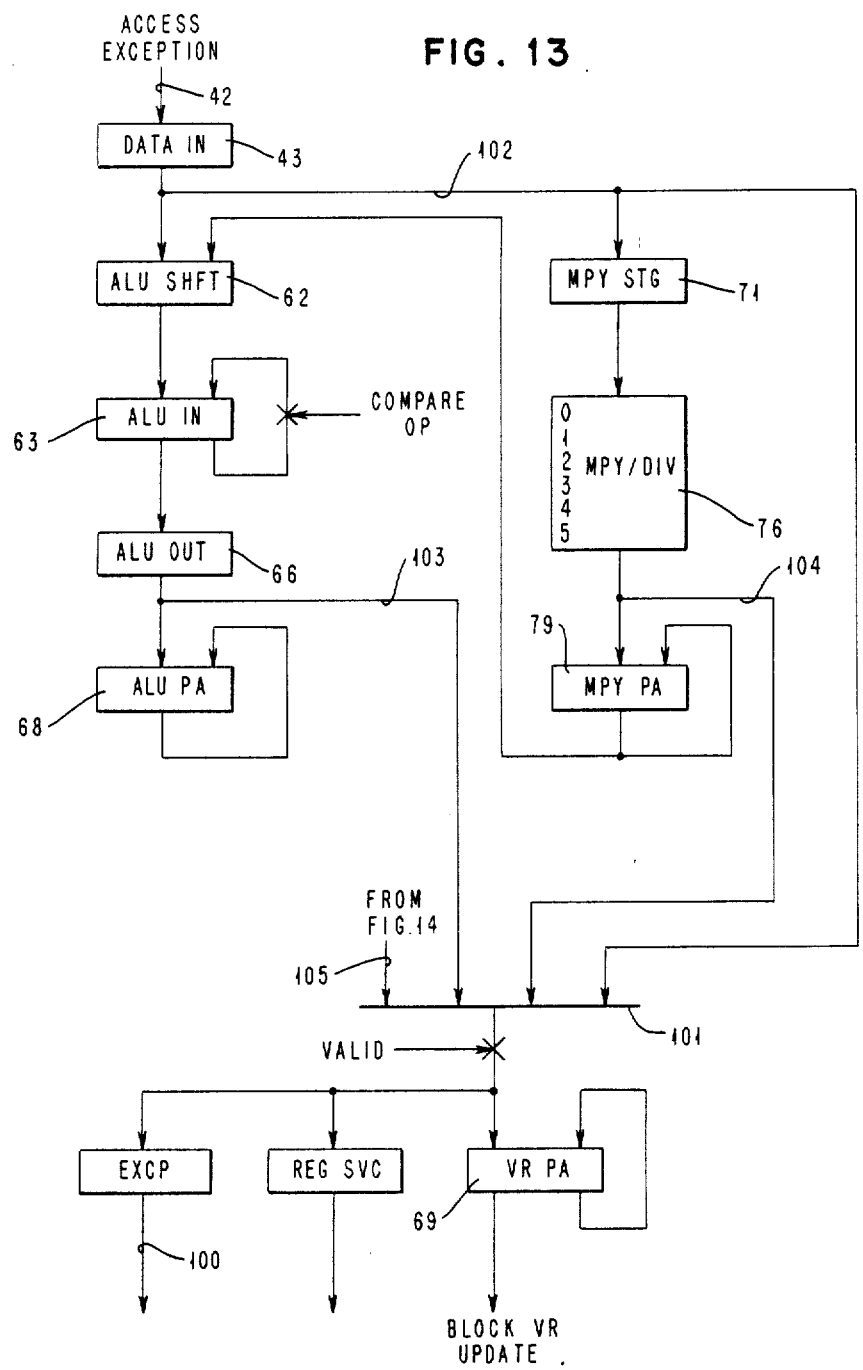
FIG. 13 shows the logic of the vector processing unit of the present invention responding to an access exception indicating an error encountered during the access of an element from main storage.

The manner in which the VPU 20 provides accurate information regarding exception or error conditions is shown in FIGS. 13 and 14. Various stages of the VPU 20 data flow are shown in these figures and have been given the same numeric designation as previously discussed. The data path for storage access exceptions is shown in FIG. 13. A data path of exception bits dealing with storage access exceptions parallels the functional data path in the VPU 20. There is one exception bit per data path stage. This exception data path is used for instructions that use a vector from the main storage element 21 of FIG. 1. If an access exception is detected in the storage system for a particular element, the CPU 22 raises the signal on line 42 (which is normally 0) and passes it on to the VPU 20 along with the bad data. The signal is put into the access exception data path, beginning at the data in register 37 and starts in the parallel data path at 43. This active bit flows with the bad data, and inhibits the put away of that data into the VR's 57. During the cycle in which the bad data would have been put away, the VPU 20 signals the access exception to the CPU on line 100, and inhibits all further put away of data for this instruction. The line 100 corresponds to the line labelled vector put away exception shown in FIG. 3, and is applied to the branch logic 48 associated with the control store 47 shown in FIG. 2.

The access exception data path is configured by control lines in accordance with the instruction being executed. On recognizing the exception signal on line 100, the CPU 22 microcode branches out of its processing loop into a common ending routine for all vector instructions that encounter an exception. In this routine, the microcode uses the VIX which is represented by the count state of the VEAR 1 representing the destination vector register, to calculate the storage address of the element with the exception. After updating address information, the microcode issues a fetch to the failing location and enters the standard interrupt handling routine. As shown in FIG. 13, logic noted generally at 101 passes the access exception to the CPU 22, and blocks the updating of the VR's 57 for data contained in the VR put away register 69. Three inputs to the logic 101 include a signal on line 102 indicating an access exception for an instruction that would normally load the VR's 57 from the data in register 37. Signal line 103 indicates an access exception noted for data in the ALU out register 66, and line 104 signals the access exception at the time prior to put away from the multiply/divide unit 76. A signal on line 105 deals with arithymetic exceptions discussed in FIG. 14.

FIG. 14 shows a data path of arithmetic exception bits which parallels part of the data path of the VPU 20. The type of exception noted is encoded into a three-bit word. The three-bit code is sent from the VPU 20 to status triggers in the CPU 22 over the line 45, previously referred to in connection with FIG. 2. As shown at 106, the transfer of the three-bit exception code will not be transferred to the CPU 22 when there is also an access exception indicated in FIG. 13.

As indicated previously, the arithmetic exception path also parallels the data path in the VPU 20. There are three different places in the data path where arithmetic exceptions may be discovered. When data is being transferred from the stage registers 71 and 72 to the multiply/divide unit 76 shown in FIG. 4, as noted at 107, a divide by 0 and unnormalized operand exception may be encountered. A multiply overflow and underflow exception may be encountered just prior to the multiply put away register 79. Finally, in the ALU 65 of FIG. 4, an ALU overflow, underflow, and significance loss exception may be encountered just prior to ALU put away register 68.

The code for various arithmetic exceptions sent from the register 44 over line 45 to the CPU stats 46 is as follows:

001—exponent overflow
010—exponent underflow
011—significance
100—fixed point overflow
101—unnormalized multiply/divide
110—floating point divide by 0

There has thus been shown in the previous description a vector processing unit configuration attachable to a base data processing system wherein sequencing of the vector processing unit is under positive control of, and synchronized with, the normal sequencing of a microprogram control store. Further, precise indication of error or exception conditions can be signalled to the interrupt handling mechanism of the base data processing system by the vector processing unit exerting control over the storage of vector elements to leave the vector processing unit in a known state for analysis by the base data processing system, and the vector processing unit further provides a coded signal to the base data processing unit indicating particular arithmetic exceptions. Flexible and efficient use of the base data processing system main storage is also effectd by the vector processing unit of the present invention through the use of logic associated with a vector mask register.

Although this invention has been shown and described with respect to plural embodiments thereof, it should be understood by those skilled in the art that various changes and omissions in the form and details of the invention may be made therein without departing from the spirit and the scope of the invention.

We claim:

1. A data processing system comprising:
   memory means for storing instruction words and operands;
   a central processing unit (CPU) connected to said memory means for fetching and decoding instructions and controlling execution of instructions, including transfer of operands to and from said memory means, the control of execution of instructions is effected by a CPU clock and microprogram control means connected to said CPU clock for generating periodic execution control signals in synchronism with said CPU clock;
   vector processing means tightly coupled to said CPU for effecting data processing on vector data; and
   interconnection means, connecting said CPU and said vector processing means, including operand transfer lines for transfer of vector data between said CPU and said vector processing means, control lines, status lines for signalling conditions of said vector processor means to said CPU, and a vector timing signal line connected to one of said execution control signals from said microprogram control means, whereby said vector processing means receives periodic execution control signals at the clock rate and is synchronized with said CPU clock on a clock pulse by clock pulse basis during execution of instructions.

2. A data processing system in accordance with claim 1, wherein said CPU includes:
   arithmetic means for effecting data processing on scalar data;
   memory access control means for controlling transfer of scalar or vector data between said memory means and said CPU;
   first means, connected with said microprogram control means, said arithmetic means, and said memory access control means, and responsive to certain of said periodic execution control signals, for controlling said arithmetic means to process scalar data and said memory access control means to transfer scalar data when decoded instructions are ones other than vector instructions; and
   second means, connected with said microprogram control means, and responsive to other of said periodic execution control signals for controlling said vector processing means when decoded instructions are vector instructions;

said second means including:

operation code transfer means connected to said control lines for transferring to said vector processing means an operation code of a vector instruction for control of said vector processing means; and data transfer means connected to said memory access control means and said operand transfer lines for transfer of the vector data between said vector processing means and said CPU.

3. A data processing system in accordance with claim 2 wherein said vector processing means includes:

vector arithmetic means for effecting data processing on vector data;

a plurality of vector registers each including a plurality of storage locations for storing a plurality of an ordered set of data;

a vector instruction register connected to said control lines for storing said operation code of vector instruction;

decode means connected to said operation code in said vector instruction register for providing output signals indicating a vector operation is to be performed;

address generating means, connected to said decode means output signals indicating a vector load or store with index instruction in said vector instruction register, and connected to a selected one of said plurality of vector registers for calculating a series of addresses in said memory means; and means connecting said address generating means to said control lines for transferring said series of addresses to said memory access control means in said CPU, whereby vector data is transferred between another selected on of said plurality of vector registers and said memory means at said series of addresses.

4. A data processing system in accordance with claim 2 wherein said vector processing means includes:

a vector mask register comprised of a plurality of binary bits, each of said plurality of binary bits corresponding to a particular one of said plurality of storage locations in said vector registers, and having one of two binary states; and gate means, connected between said vector registers and said operand transfer lines, and connected to the binary bits in said vector mask register, for selectively transferring vector data between a particular one of said plurality of locations in said vector registers and said operand transfer lines when the corresponding binary bit in said mask register has a particular one of the two binary states, whereby vector data is transferred between consecutive addresses in said memory means and selectable ones of said storage locations of said vector registers.

5. A data processing system in accordance with claim 2 wherein said second means includes:

status responsive means connected to said status lines and said microprogram control means for controlling said microprogram control means to initiate a control sequence in response to conditions in said vector processing means.

6. A data processing system in accordance with claim 5 wherein said vector processing means includes:

a vector arithmetic unit including a multistage data path, including temporary storage stages and data processing stages, one of said data processing stage being a final data path stage where processing of data by said vector arithmetic unit has been completed;

gate means for interconnecting said temporary storage stages and data processing stages for transferring data through said multistage data path; and advance signalling means connected to said vector timing signal line and said gate means, whereby transfer of data through said multistage data path is controlled by said microprogram control means in said CPU.

7. A data processing system in accordance with claim 6 wherein said multistage data path includes:

interconnected exception indicating stages, one for each of said temporary storage stages and said data processing stages; and exception signalling means, connected between said exception indicating stage of and final data path stage and said status lines, for transferring exception conditions to said status responsive means in said CPU.

8. A data processing system in accordance with claim 7 wherein said multistage data path includes:

a data input stage and associated exception indicating stage said data input stage including data error detecting means for providing an invalid data indication to said associated exception indicating stage;

means in said exception signalling means, responsive to said invalid data indication for transferring an access exception condition to said status responsive means.

9. A data processing system in accordance with claim 8 wherein said data processing stages include:

error detection means connected to an associated one of said exception indicating stages for providing an arithmetic error indication; and means in said exception signalling means, responsive to said arithmetic error indication from said exception indicating stage of said final data path stage for transferring an arithmetic exception condition to said status responsive means.

10. A data processing system in accordance with claim 9 wherein said arithmetic error detection means includes:

means for providing a multi-bit binary encoded arithmetic error indication for distinguishing among a plurality of error conditions; and said means in said exception signalling means includes means for transferring said multi-bit binary encoded arithmetic error indication to said status responsive means.

* * * * *